Patented July 22, 1952

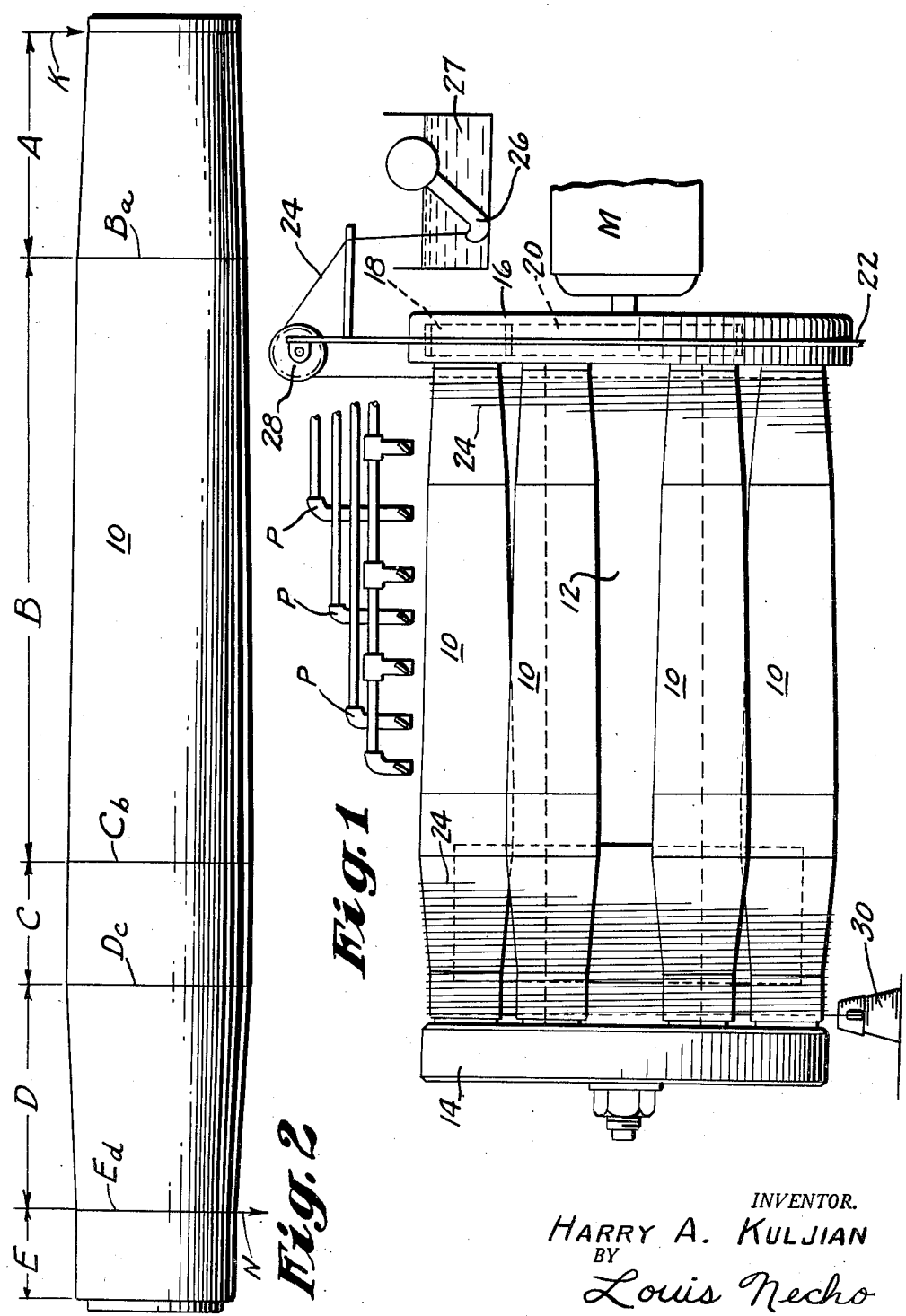

2,603,853

UNITED STATES PATENT OFFICE 2,603,853

FILAMENT STORING AND ADVANCING REEL

Harry Asdour Kuljian, Merion, Pa.

Application May 17, 1950, Serial No. 162,577

9 Claims. (Cl. 28—71.6)

A thread storing and advancing reel of the type to which the present invention is addressed is formed of a plurality of elongated, rotatable rolls arranged in a circle with the axes of some or of all of the rolls skewed with reference to an imaginary axis. When the rolls are rotated about their respective axes, a filament wound about the reel will move, in the form of a helix circumscribing all of the rolls from one end of the roll to the other.

As the filament moves longitudinally of the reel, it is first subjected to various liquid treatments, to complete its regeneration, and it is subsequently subjected to heat so that the filament will be dry before it leaves the reel.

In order to attain the desired denier, and in order to strengthen the filament, it should be subjected to controlled stretching during its regeneration, or while it is undergoing the liquid treatments referred to. In order to minimize shrinkage in materials knit or woven from the finished filament, it is desirable to allow the filament to undergo controlled shrinkage during the drying operation.

It is therefore the object of the invention to produce an improved reel for automatically effecting the desired stretching and the desired shrinkage of the filament as it moves from one end of the reel to the other.

In the accompanying drawings

Fig. 1 is a side elevational view of a filament storing and advancing reel embodying my invention only so much of the reel shown as is necessary for understanding the invention.

Fig. 2 is an enlarged side elevational view of a roll embodying my invention and used in building the reel of Fig. 1.

The reel of Fig. 1 is formed of a number of rolls 10 which are arranged in a circle about a center post 12. The center post 12 supports end plates 14 and 16 in which the opposite ends of the rolls are journalled in any conventional manner, not shown. The right-hand ends of the rolls are equipped with gears 18 which mesh with a center gear 20 carried by the shaft of a motor M. The axes of the rolls, or at least the axes of some of them, are so skewed relative to the axis of center post 12 that, when a filament is wound about the reel, it will move, when the rolls are rotated about their axes, in the form of a helix circumscribing all of the rolls, from the right-hand end of the reel to the left-hand end thereof. The reel is supported in cantilever fashion by means of any suitable frame or support 22.

The filament 29 is produced in the usual way by extruding an appropriate solution, through a spinnette 26, into a coagulating bath 27. Conventionally, the filament is then passed over one or more godet wheels 28 before its leading end is wound about the right-hand end of the reel. As stated, when the rolls are rotated, the filament will move, in the form of a helix, toward the left-hand end of the reel from which it is wound upon a take-up spool 30.

In order to complete its regeneration, the filament is subjected to the action of various liquids which are supplied to the filament from pipes P which lead from sources of supply, not shown. The liquid treatments are conventional and need not be described in detail. It is sufficient to state that they include acids, alkali and water washes, which are applied in a well known order.

In order to eliminate the necessity of using one or more godet wheels 28, or, in certain cases, to supplement the stretching action of the godet wheels and in order to effect controlled shrinkage of the filament, I have devised the roll shown in Fig. 2.

This roll may be said to be divided into sections A, B, C, D and E, with section A beginning at the point at which the filament is first wound around the reel, as shown by arrow K and with section E terminating at the point at which the filament leaves as indicated by arrow N.

Not by way of limitation, but by way of example, the approximate characteristics of a roll operative for the purposes specified will be about as follows:

Section A will be 6 inches long, the diameter of the roll at the beginning of section A will be 2.82 inches, and its diameter at line $Ba$ will be 2.94 inches. This makes the increment in diameter of section A of the order of .12/6; the length of section B will be 13 inches and the diameter of the roll at line $Cb$ will be three inches so that the value of the increment in diameter between lines $Ba$ and $Cb$ will be of the order of .06/13; the section C will have a uniform diameter of 3 inches and its length may be 3 inches or any selected value not inconsistent with the processing operation; the length of section D will be 5 inches and the diameter of the roll at $Ed$, will be 2.88 of one inch so that the decrease in diameter is of the order of .12/5; and the section E is 2 or more inches long and will have a uniform diameter of 2.88 inches.

By this arrangement, the freshly coagulated filament is stretched at a relatively rapidly increasing rate as it moves from the receiving end of the roll to line $Ba$ as represented by the formula .12/6. But, as the filament travels across section B, its regeneration will progress less rapidly and therefore the rate at which the filament is to be further stretched is reduced to the value represented by the formula .06/13. In fact, during the travel of the filament across section B, the stretching effected is for maintaining proper friction of the filament with the roll as well as for further longitudinally tensioning the filament. This is necessary for keeping the filament convolutions properly spaced because, if the filament is wet and is not sufficiently tensioned about the roll, its convolutions will tend to slip back and form bundles. By the time the filament has reached line $Cb$ its regeneration has been completed and its drying is begun by the application of heat, in a manner not shown, from line $Cb$ to the end of the reel. When the wet filament is first subjected to heat, there is no appreciable rise in temperature and no appreciable shrinkage and, therefore section C, where the initial drying takes place, is of a uniform diameter. By the time the filament is ready to leave section C, a large amount of its moisture content has been evaporated and it enters the stage where the temperature begins to rise appreciably and where the filament begins to shrink appreciably. Therefore, section D is tapered in the opposite direction at a rate represented by the formula .12/5 which is calculated to correspond to the rate of drying and of shrinkage of an unrestricted filament. When the filament reaches section E it is completely dry and such tendency to shrink as may still be there is only enough to guarantee proper frictional engagement of the filament with the roll. Therefore section E, like section C, is of a uniform, albeit of a smaller, diameter.

The tapering of the various sections of the roll effects the stretching and shrinkage by varying the peripheral speed of the various sections of the roll. Thus, if the peripheral speed of the roll at the beginning of Section A, where the diameter of the roll is 2.82, is expressed as 100%, the peripheral speed will progressively increase to 104% at line $Ba$ and to 106% at line $Cb$. From line $Dc$ to line $Ed$, the peripheral speed progressively decreases so that at line $Ed$ the peripheral speed will be 102%.

I claim:

1. For use in the manufacture or processing of filaments, a filament storing and advancing reel including a plurality of rolls arranged in a circle about an imaginary axis, with axes of at least some of said rolls skewed relative to said imaginary axis, and means for rotating said rolls about their axes, at least one of said rolls having a first end portion thereof at the filament receiving end of the reel flared in the direction of the filament discharging end of the reel at a first rate of increment in its diameter, said roll also having a second portion thereof adjacent said first portion flared in the same direction but at a second rate of increment in its diameter which second rate of increment is smaller than said first rate of increment.

2. The structure recited in claim 1 in which said second portion merges with a third portion having a uniform diameter substantially equal to the diameter of the roll at the junction of said second and third portions.

3. The structure recited in claim 2 in which said third portion merges with a fourth portion which is flared in the opposite direction with its diameter decreasing in the direction of the filament-discharging end of the reel.

4. The structure recited in claim 1 in which said second mentioned portion merges with a third portion having a uniform diameter substantially equal to the diameter of the roll at the junction of said first and second portion, in which said third portion merges with a fourth portion which is flared in the opposite direction with its diameter decreasing in the direction of the filament discharging end of the reel, and in which said fourth portion merges with a fifth portion having a uniform diameter substantially equal to the diameter of the roll at the junction of said fourth and fifth portions.

5. The structure recited in claim 1 in which said second portion is longer than said first portion.

6. A roll for use in a filament storing and advancing reel of the type which is used for processing synthetic filaments and which has a filament receiving end and a filament discharging end, said roll having a first portion at the filament receiving end of the reel flared in the direction of the filament discharging end of the reel at a first rate of increment in the diameter of the roll, said roll also having a second portion adjacent said first portion and flared in the same direction but at a second rate of increment in the diameter of the roll which is smaller than said first rate of increment.

7. The structure recited in claim 6 in which said second portion is longer than said first portion.

8. The structure recited in claim 6 in which the roll has a third portion which is flared in the opposite direction with its diameter decreasing in the direction of the filament discharging end of the reel.

9. The structure recited in claim 8 in which the roll also includes a fourth portion between said second and third portions, said fourth portion having a uniform diameter substantially equal to the maximum diameter of said second portion.

HARRY ASDOUR KULJIAN.

REFERENCES CITED

The following references are of record in the file of this patent:

UNITED STATES PATENTS

| Number | Name | Date |
|---|---|---|
| Re. 22,178 | Oppenlaender | Sept. 15, 1942 |
| 1,920,224 | Weaver | Aug. 1, 1933 |
| 2,302,508 | Sordelli | Nov. 17, 1942 |
| 2,563,039 | Hudson | Aug. 7, 1951 |

FOREIGN PATENTS

| Number | Country | Date |
|---|---|---|
| 509,854 | Great Britain | July 24, 1939 |
| 523,902 | Great Britain | July 25, 1940 |
| 539,200 | Great Britain | Sept. 1, 1941 |